Figure 1:
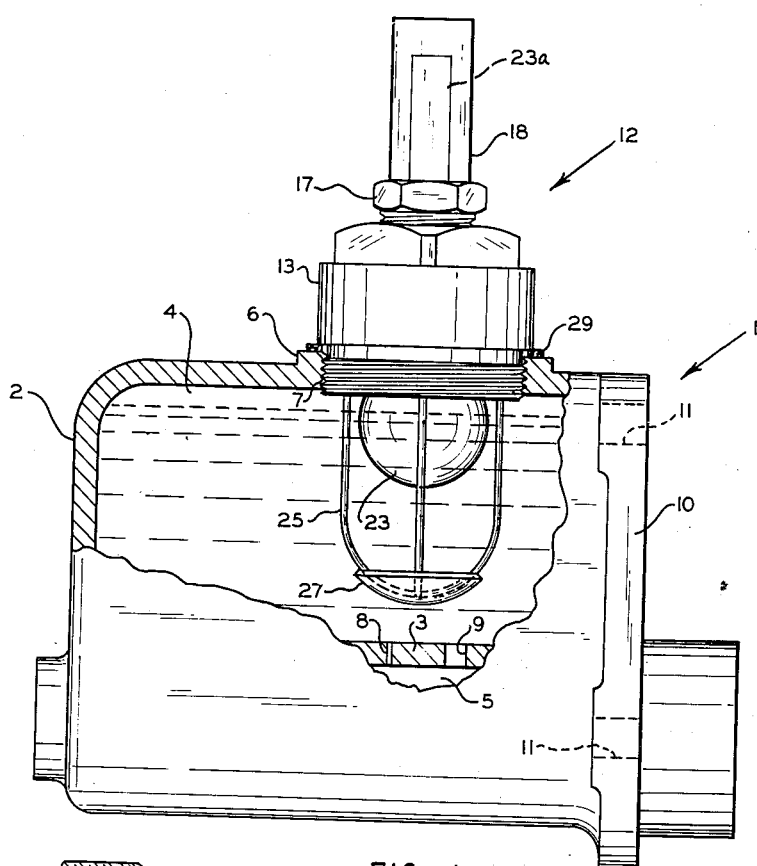

Dec. 20, 1960    E. L. WALKOWIAK    2,964,945
HYDRAULIC BRAKE FLUID-LEVEL INDICATOR
Filed June 7, 1957

INVENTOR.
EDWARD L. WALKOWIAK
BY
ATTORNEYS

United States Patent Office 2,964,945
Patented Dec. 20, 1960

2,964,945

HYDRAULIC BRAKE FLUID-LEVEL INDICATOR

Edward L. Walkowiak, 2219 Alger, Saginaw, Mich.

Filed June 7, 1957, Ser. No. 664,223

1 Claim. (Cl. 73—322)

This invention relates to hydraulic brake systems for motor vehicles or the like and more particularly to a hydraulic brake system of the kind including a master cylinder having means for indicating the quantity of hydraulic fluid in the system without necessitating the removal of any parts.

A hydraulic brake system for a motor vehicle and the like customarily includes a master cylinder having a pressure chamber and a reservoir chamber from which hydraulic fluid is supplied to other parts of the system. The reservoir chamber ordinarily is provided with an opening through which additional fluid may be supplied to the system when needed, the opening normally being closed by a cap or plug. The master cylinder normally is mounted in such position that it readily is accessible to a mechanic and it not infrequently occurs that the cylinder housing and the closure cap become encrusted with dirt. If, in the filling of the master cylinder reservoir chamber, fluid is permitted to overflow the chamber and run down the sides of the cylinder housing, the somewhat sticky film of fluid adhering to the outer casing of the cylinder promotes the encrustation of the latter with dirt. When it becomes necessary or advisable to check the quantity of fluid in the system, care should be taken that the master cylinder housing adjacent to the opening be wiped clean so as to prevent dirt from falling through the opening into the reservoir chamber when the closure cap is removed. Unfortunately, not all mechanics exercise the proper care when removing the closure cap and, as a consequence grit enters the reservoir chamber and finds its way to other parts of the system.

Many of the parts of conventional hydraulic brake systems are formed of rubber or other similar material which can become severely damaged, even to the point of failure, by the presence of grit in the hydraulic fluid. Thus, it is not uncommon for the hydraulic brakes of an automobile to fail, even though there is an adequate amount of fluid in the system, the failure being caused by the cutting and abrasive action of grit on the rubber or rubber-like parts of the system.

An object of this invention is to provide apparatus for use in conjunction with the master cylinder of hydraulic brake systems, the apparatus being operable to indicate the quantity of hydraulic fluid in the system without necessitating the removal of any parts, thereby reducing the possibility of dirt and grit entering the system.

Another object of the invention is to provide apparatus of the kind referred to which is readily adaptable to conventional hydraulic brake master cylinder constructions currently in use.

A further object of the invention is to provide means of simplified and economical construction for indicating the level of hydraulic fluid in a brake system.

Figure 2:
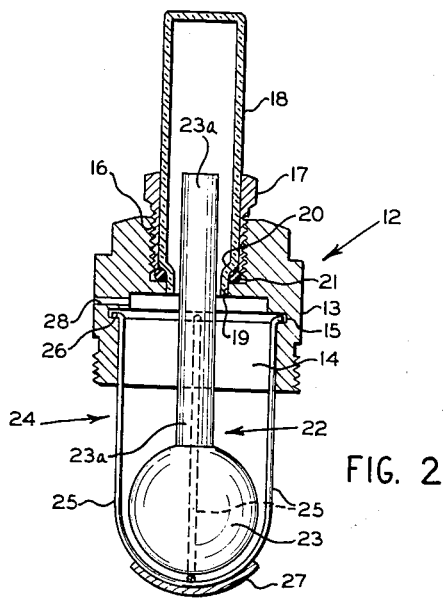

Other objects and advantages of the invention will be pointed out specifically or will become apparent from the following description when it is considered in conjunction with the appended claims and the accompanying drawings, in which:

Figure 1 is a view, partly in side elevation and partly in section, of a hydraulic brake system master cylinder equipped with apparatus constructed in accordance with the invention; and Figure 2 is a sectional view of a portion of the structure shown in Figure 1.

Apparatus constructed in accordance with the invention is intended for use in an automobile or the like hydraulic brake system including as a part thereof a master cylinder designated generally by the reference character 1 and comprising a hollow housing or body 2 divided by an inner partition 3 into a reservoir chamber 4 and a pressure chamber 5 in which a piston (not shown) is mounted for reciprocating movements to force hydraulic fluid from the master cylinder 1 to other parts of the system. The cylinder body 2 may be provided with an upstanding boss 6 on its upper surface which defines an opening 7 through which hydraulic fluid may be admitted to the interior of the cylinder, fluid from the chamber 4 being admitted to the pressure chamber 5 through suitable openings 8 and 9 in the partition 3. One end of the cylinder 1 may be provided with a flange 10 equipped with suitably spaced openings 11 for reception of bolts (not shown) or the like by means of which the cylinder may be mounted in a convenient location such as on the fire wall of a motor vehicle.

Fluid level indicating means formed according to the invention is designated in the drawings generally by the reference character 12 and comprises an exteriorly threaded plug 13 adapted to be received in the threaded opening 7 in the cylinder body 2. As is best shown in Fig. 2, the lower portion of the plug 13 is cored to form a smooth wall, substantially cylindrical chamber 14 terminating at its upper end in an annular groove 15 for a purpose to be explained hereinafter. The upper end of the plug 13 is provided with a threaded opening 16 adapted to receive a hollow, exteriorly threaded nipple 17 in which is mounted a tube 18 formed of glass or other suitable transparent material. The chamber 14 and the opening 16 are in communication with one another through an opening 19, the lower end of the tube 18 being received within the opening 19. As is shown in Fig. 2, the lower end of the tube 18 is formed with a neck portion 20 of reduced diameter and between the neck 20 and the wall of the opening 16 is a sealing O-ring 21.

Means responsive to the rise and fall of the level of hydraulic fluid in the reservoir 4 to indicate the quantity of fluid in the system is provided and includes a float 22 composed of a bulb portion 23 and an integral stem portion 23a. The stem portion is freely slideable within the tube 18 and the float is guided in its movements by a cage 24 which conveniently may be formed of two or more substantially U-shaped wires 25 so arranged that the float is surrounded. The cage 24 preferably is readily removable from the chamber 14 and this characteristic may be achieved by bending the ends 26 of the wires 25 so that they project radially outwardly from the cage. The projecting ends 26 of the wires may be received in the annular groove 15 at the upper end of the chamber 14. The natural resilience of the wires 25 will assure retention of the cage in its proper position with respect to the plug 13 when desired, but the members 13 and 24 may be separated easily by compressing the wires 25 radially inwardly.

At the lower end of the cage 24 is a deflector plate 27 which may be secured to the wires in any suitable manner, such as by spot welding, the function of the deflector plate being to prevent a sudden surge of fluid from the pressure chamber 5 into the reservoir chamber 4 exerting a violent action on the float and also to deflect fluid to the sides of the cage so as to reduce the possibility of fluid being discharged from a vent opening 28 provided in the plug 13 adjacent to the upper end of the chamber 14.

Master cylinders of the kind with which the invention is adapted for use usually are provided with a cap (not shown) or the like which normally seals the opening 7. To install the apparatus constructed in accordance with the invention, the conventional closure cap is removed and the apparatus 12 installed in its stead. It is contemplated that apparatus 12 will be manufactured in more than one size so as to enable its use with master cylinders made by different manufacturers. When installing the apparatus 12 it is preferable that a gasket 29 surround the opening 7 so as to seal the latter.

In operation, hydraulic fluid is distributed from the reservoir 4 to other parts of the system under the influence of a piston in the pressure chamber 5. There normally will be a supply of fluid in the system sufficient that, when the brakes are relaxed, the level of fluid in the hydraulic reservoir 4 will be at some point intermediate the partition wall 3 and the top wall of the cylinder 2. The quantity of fluid in the reservoir can be determined readily merely by observing the position of the float stem 23a. If desired, the tube 18 may be provided with indicia (not shown) to be read in conjunction with a reference mark (not shown) on the stem 23a, or vice versa, to facilitate the determination of the hydraulic fluid level. The quantity of hydraulic fluid in the system thus may be checked frequently without necessitating removal of any of the parts of the master cylinder, thereby overcoming the possibility of introducing dirt and grit to the system.

The disclosed embodiment is representative of a presently preferred form of the invention, but it is intended to be illustrative rather than definitive thereof. The invention is defined in the claims.

I claim:

In a hydraulic brake system for a vehicle, a master cylinder having a body defining a fluid reservoir chamber, said chamber having a first opening therein for the introduction of fluid to said chamber and a second opening therein through which fluid passes from and to said chamber to and from other parts of said system; a closure member removably received in said first opening for closing the latter; and means forming part of said closure member for indicating the level of fluid in said chamber, said indicating means comprising a rigid float having a first portion thereof loosely received in said chamber and a second portion integral with said first portion extending through an opening formed in said closure member and projecting beyond the latter and said body member, a hollow, transparent member secured to said closure member and receiving said second portion of said float, one of said members having a vent opening therein for the ingress and egress of air thereto, an open cage formed of substantially U-shaped wires having their free ends bent laterally and removably received in a recess formed in said closure member, said cage freely receiving said first portion of said float, and a concavo-convex deflecting plate secured to said wires at the bottom of the cage formed thereby and fixing said wires one to another, said deflecting plate being interposed between said float and said second opening in said chamber and located in the path of fluid entering said chamber through said second opening.

References Cited in the file of this patent

UNITED STATES PATENTS

| | | |
|---|---|---|
| 505,186 | Bartholomew | Sept. 19, 1893 |
| 686,304 | Katz | Nov. 12, 1901 |
| 772,583 | Shay | Oct. 18, 1904 |
| 1,257,693 | Furman | Feb. 26, 1918 |
| 1,482,852 | Klopper | Feb. 5, 1924 |
| 1,564,701 | Mattingley | Dec. 8, 1925 |
| 1,644,378 | Hirschler | Oct. 4, 1927 |
| 1,712,794 | Jarvis | May 14, 1929 |
| 2,387,011 | Czerner | Oct. 16, 1945 |
| 2,484,163 | Gosheff | Oct. 11, 1949 |
| 2,615,105 | Whitney | Oct. 21, 1952 |
| 2,772,331 | Carothers | Nov. 27, 1956 |

FOREIGN PATENTS

| | | |
|---|---|---|
| 651,949 | France | Oct. 16, 1928 |